United States Patent [19]

Instance

[11] Patent Number: 4,708,368

[45] Date of Patent: Nov. 24, 1987

[54] LABEL

[76] Inventor: David J. Instance, Guinea Hall, Sellindge, Kent, United Kingdom

[21] Appl. No.: 861,361

[22] Filed: May 9, 1986

[30] Foreign Application Priority Data

May 10, 1985 [GB] United Kingdom ................. 8511850

[51] Int. Cl.[4] ........................ A42D 15/00; B41L 1/20; B31F 7/00; B32B 31/00

[52] U.S. Cl. ........................................ 283/81; 282/25; 156/227; 156/277

[58] Field of Search .......................... 283/81, 103, 105; 282/22 A, 23 A, 25; D20/22, 27, 204; 40/2 A; 156/52 A, 52 AC, 226, 227

[56] References Cited

U.S. PATENT DOCUMENTS

| | | | |
|---|---|---|---|
| 1,924,909 | 8/1933 | Brown | 283/81 |
| 2,134,112 | 10/1938 | Efron | 282/25 |
| 3,974,311 | 8/1976 | Cherrin et al. | 283/81 |
| 4,070,220 | 1/1978 | Cavender | 156/277 |
| 4,323,608 | 4/1982 | Denny et al. | 156/227 |
| 4,513,993 | 4/1985 | Brown | 282/25 |
| 4,534,582 | 8/1985 | Howard | 156/227 |

*Primary Examiner*—E. R. Kazenske
*Assistant Examiner*—Paul M. Heyrana, Sr.
*Attorney, Agent, or Firm*—Birch, Stewart, Kolasch & Birch

[57] ABSTRACT

A label for affixing to a container comprising a longitudinal strip which is divided into a row of four or more panels by three or more corresponding transverse fold lines, the first panel being wider in the transverse direction than the remaining panels and the remaining panels being folded about the respective fold lines to lie over the rear face of the first panel so that two opposing longitudinal edge regions of the rear face of the first panel are left uncovered by the remaining panels and so that at least a portion of the remaining panels other than the second and third panels extends beyond the end edge of the first panel, and a support web to which the two edge regions are adhered such that the remaining panels are disposed between the first panel the support web and such that the said portion is exposed and can be pulled by a user thereby to pull out at least the last two panels from between the first panel and the support web.

9 Claims, 6 Drawing Figures

LABEL

BACKGROUND TO THE INVENTION

The present invention relates to a label for affixing to a container and in particular to such a label which is self-adhesive and before being stuck on a container is carried on a release backing material.

The labels of the present invention have particular application in the labelling of containers such as boxes, packets, tins, jars, bottles etc. It is frequently desirable when labelling such containers to have a label which is a so-called "extended text" label which provides additional surface area for information relating to the product in the container.

SUMMARY OF THE INVENTION

The present invention aims to provide such a label and in particular a label which is relatively cheap to manufacture and which can carry a high-quality lithographically printed image.

Accordingly, the present invention provides a label for affixing to a container comprising a longitudinal strip which is divided into a row of four or more panels by three or more corresponding transverse fold lines, the first panel being wider in the transverse direction than the remaining panels and the remaining panels being folded about the respective fold lines to lie over the rear face of the first panel so that two opposing longitudinal edge regions of the rear face of the first panel are left uncovered by the remaining panels and so that at least a portion of the remaining panels other than the second and third panels extends beyond the end edge of the first panel, and a support web to which the two edge regions are adhered such that the remaining panels are disposed between the first panel and the support web and such that the said porton is exposed and can be pulled by a user thereby to pull out at least the last two panels from between the first panel and the support web.

BRIEF DESCRIPTION OF THE DRAWINGS

Embodiments of the present invention will now be described by way of example only with reference to the accompanying drawings, in which.

DESCRIPTION OF THE PREFERRED EMBODIMENTS

Figure 1:
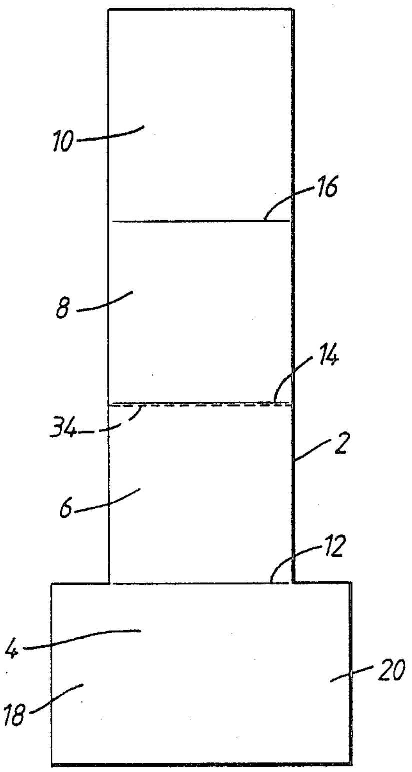
FIG. 1 is a plan view of a longitudinal strip for use in a label in accordance with a first embodiment of the present invention.
Figure 2:
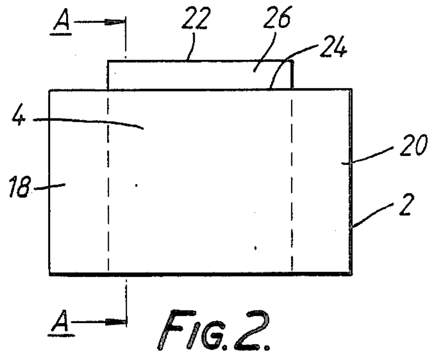
FIG. 2 is a plan view of the longitudinal strip of FIG. 1 when folded.
Figure 3:
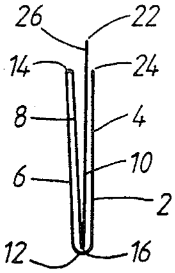
FIG. 3 is a section along A—A of the folded longitudinal strip in FIG. 2.

Referring to FIGS. 1 to 4, a longitudinal strip 2, e.g. of paper, comprises a row of four panels 4, 6, 8, 10 which are divided by respective transverse fold lines 12, 14, 16. The first panel 4 is wider than each of the remaining panels 6, 8, 10 so as to form two opposing longitudinal edge regions 18,20 which are disposed outside the width of the remaining panels 6, 8, 10. The strip 2 is folded by folding the last panel 10 about fold line 16 so as to lie under panel 8 as viewed in FIG. 1. Panels 8 and 10 are than folded over panel 6 by folding about fold line 14 and then panels 6, 8 and 10 are folded over first panel 4 by folding about fold line 12. Panels 6, 8 and 10 are folded in a concertina-like manner and those panels 6, 8, 10 are folded about fold line 12 back over first panel 4 so that the two end panels 8, 10 are disposed between the first panel 4 and the second panel 6 as is shown in FIG. 3. When the strip 2 is so folded, the two edge regions 18, 20 are left uncovered. The second and third panels 6, 8 have a length which is substantially the same as that of the first panel 4. The fourth panel 10 is made slightly longer than the other panels 6, 8 so that when the strip 2 is folded as aforesaid the end edge 22 of the last panel 10 protrudes above the end edge 24 of the first panel 4 to form a protruding tab portion 26.

The rear surface of the folded longitudinal strip 2 is adhered by a layer of adhesive to a support web 28, which may also be composed of paper, to form a label 30. The support web 28 is self-adhesive and is carried on a release backing material 32 such as a silicone-coated paper. The rear surface of the folded longitudinal strip 2 comprises the rearwardly facing surface of the second panel 6 and the rearwardly facing surface of each of the two edge regions 18, 20. The extent of the rear surface and of the layer of adhesive is showed by hatched lines in FIG. 4.

The support web 28 may be adhered by its self-adhesive surface to a container such as a bottle, packet, tin, jar, etc. The panels of the strip 2 are printed, preferably with high quality lighotgraphically-printed images, with information relating to the product which is contained within the container.

In order to open up the label so as to be able to study the information which is printed on the panels 8, 10 which are folded between the first (front) panel 4 and the support web 28, a user pulls upwardly, in the direction of arrow B, the tab portion 26. Panels 8 and 10 are pulled out. In a particularly preferred arrangement, a line of perforations 34 is provided along fold line 14 between the second and third panels 6, 8 so that panels 8 and 10 may be removed from the label 30 by tearing along the line of perforations 34. It will readily be seen that when panels 8 and 10 are pulled out as aforesaid the line of perforations 34 will be approximately in line with the upper edge 24 of the front panel 14. In such an arrangement, panels 8 and 10 can constitute a removable sheet of instructions relating to the use of the product or a voucher or ticket for use in promoting or marketing the product.

If desired, the rear face of the second panel 6 may not be adhered directly to the support web 28 but the longitudinal strip 2 may be adhered to the support web solely by the two edge regions 18, 20. With such an arrangement, the panels 8 and 10 do not necessarily have to be folded between panels 4 and 6 but alternatively may be folded behind panel 6.

Furthermore, the last panel 10 does not have to be longer than the remaining panels 4, 6, 8. The last panel 10 may be any appropriate length so long as the panels which are folded behind the first panel 4 can be pulled out from behind the first panel 4. In addition, the panels to be removed from the label 30 may be made shorter in length than the first and second panels 4, 6. It is preferred that the first and second panels 4, 6 have substantially the same length when a line of perforations 34 is present so that the line of perforations 34 is in line with the top edge 24 of the first panel 4 so that tearing therealong is facilitated.

The longitudinal strip 2 may be composed of more than four panels. In particularly preferred arrangements, the longitudinal strip 2 is composed of an even number of panels which are folded in a concertina-like manner similar to that shown in FIGS. 1 to 4 whereby the end edge of the last panel is near that of the first panel and is exposed so that it can be grabbed by a user in order to pull the longitudinal strip 2 out as aforesaid.

Figure 4:
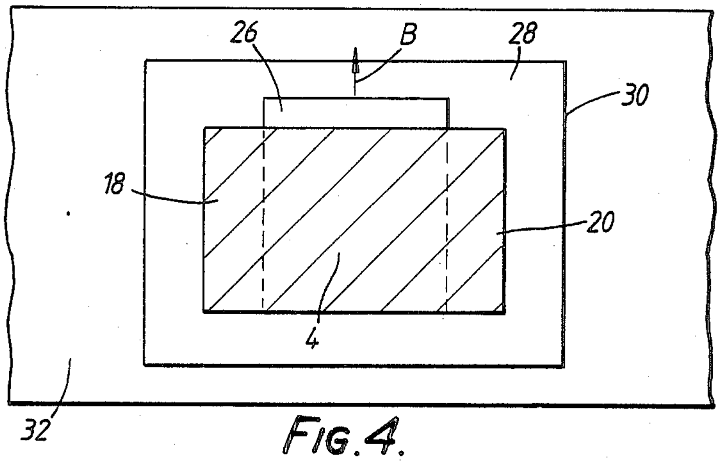
FIG. 4 is a plan view of the folded strip of FIG. 2 adhered to a support web thereby to form a label in accordance with the present invention.
Figure 5:
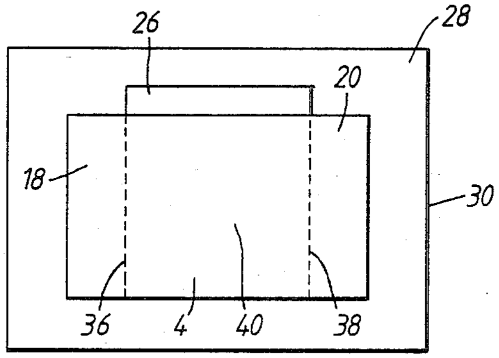
FIG. 5 is a plan view of a label in accordance with a second embodiment of the present invention.

A modification of the label of FIGS. 1 to 4 is shown in FIG. 5. The label of FIG. 5 has two weakened tear lines 36, 38, such as lines of perforations, which extend in parallel across the length of the first panel 4. Each weakened tear line 36, 38 is at a respective inward longitudinal edge of a respective longitudinal edge region 18, 20 and is generally aligned with respective longitudinal edges of the remaining panel or panels. A user can tear along weakened tear lines 36, 38 thereby to reveal the rearwardly facing surface of that central part 40 of the first panel 4 which is defined therebetween. The rearwardly facing surface may carry printed information. Also, when the second panel 6 is not directly adhered to the support web 28, tearing along the weakened tear lines 36, 38 can allow the central part 40 of the first panel 4 and the remaining panels 6, 8, 10 to be separated from the support web 28.

Figure 6:
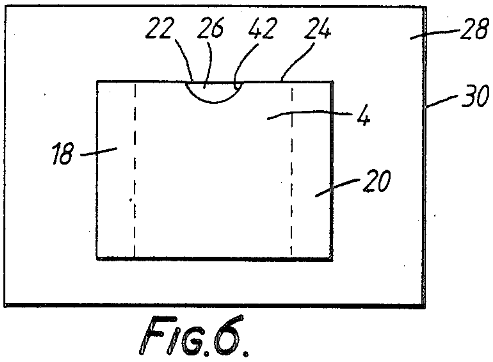
FIG. 6 is a plan view of a label in accordance with a third embodiment of the present invention.

A further modification of the label is shown in FIG. 6. In this modification, the panels 4, 6, 8 and 10 are made substantially the same in length so that at least one upper edge of the folded strip is aligned with the end edge 24 of the first panel 4. In the illustrated arrangement the end edge 22 of the last panel 10 is aligned with the end edge 24. The end edge 24 of the first panel 4 is not straight but is provided with a semi-circular cut-out 42 which exposes the protruding tab portion 26 adjacent the edge 22 of the last panel 10. The exposed protruding tab portion 26 of panel 10 which extends beyond the cut-out 42 in the end edge 24 can easily be engaged by the fingers of a user so as to pull the strip out from behind the first panel 4.

As is shown in FIG. 4, the labels 30 of the various embodiments of the present invention may be self-adhesive and may be carried in succession on a release backing which may be wound into a reel for easy application of the labels 30 to respective containers to be labelled.

The labels of the present invention may be made by the method which is disclosed in British Patent Specification No. 2127378 published Apr. 14, 1984 in the name of David John Instance, which method can produce a succession of self-adhesive labels carried on a backing of release material.

In such a method, a laminar material which comprises a support web coated on its reverse side with a pressure-sensitive adhesive and having a backing of release material is cut so as to cut from the support web a succession of spaced label base portions 28 on the release backing material 32. A layer of adhesive is then applied to an area within each label base portion so that each layer of adhesive extends across an area such as that shown by the hatched lines in FIG. 4. Subsequently, the rear surface of a folded longitudinal strip 2 is adhered by each layer of adhesive to a respective label base portion 28. At some stage after the cutting of the support web, the waste portions of the support web outside the label base portions 28 are removed from the release backing material. The resultant length of release backing material carrying the succession of labels 30 may then be wound up into a reel.

What I claim is:

1. A label for affixing to a container comprising a longitudinal strip which is divided into a row of four or more panels by three or more corresponding transverse fold lines, the first panel being wider in the transverse direction than the remaining panels and the remaining panels being folded about the respective fold lines to lie over the rear face of the first panel so that two opposing longitudinal edge regions of the rear face of the first panel are left uncovered by the remaining panels and so that at least a portion of the remaining panels other than the second and third panels extends beyond the end edge of the first panel, and a support web to which the two edge regions are adhered such that the remaining panels are disposed between the first panel and the support web and such that the said portion is exposed and can be pulled by a user thereby to pull out at least the last two panels from between the first panel and the support web.

2. A label according to claim 1, wherein those panels other than the first and second panels are folded in a concertina-like manner so that the said portion is the end edge of the last panel.

3. A label according to claim 1, wherein the rear face of the second panel is also adhered to the support web and the remaining panels are folded between the first and second panels.

4. A label according to claim 1, wherein the second panel is substantially the same length as the first panel.

5. A label according to claim 1, further comprising a line of perforations which extends transverse to the strip whereby a portion of the strip can be separated from the rest of the label by tearing along the line of perforations.

6. A label according to claim 5, wherein the line of perforations extends along that transverse fold line which is between the second and third panels.

7. A label according to claim 1, further comprising two weakened tear lines which extend in parallel longitudinally across the first panel, each weakened tear line extending substantially along the inward edge of a respective one of the two longitudinal edge regions.

8. A label according claim 1, wherein the rear face of the support web is self-adhesive.

9. A reel of release backing material carrying thereon a succession of self-adhesive labels as claimed in claim 8.

* * * * *